US011620384B2

(12) United States Patent
Smith et al.

(10) Patent No.: US 11,620,384 B2
(45) Date of Patent: Apr. 4, 2023

(54) INDEPENDENT MALWARE DETECTION ARCHITECTURE

(71) Applicant: UT-Battelle, LLC, Oak Ridge, TN (US)

(72) Inventors: Jared M. Smith, Oak Ridge, TN (US); Rachel L. Petrik, Oak Ridge, TN (US); Berat E. Arik, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 831 days.

(21) Appl. No.: 16/530,054

(22) Filed: Aug. 2, 2019

(65) Prior Publication Data
US 2020/0104498 A1 Apr. 2, 2020

Related U.S. Application Data

(60) Provisional application No. 62/738,437, filed on Sep. 28, 2018, provisional application No. 62/738,418, filed on Sep. 28, 2018.

(51) Int. Cl.
*G06F 21/56* (2013.01)
*G06N 3/08* (2023.01)
*H04L 9/40* (2022.01)

(52) U.S. Cl.
CPC .......... *G06F 21/567* (2013.01); *G06F 21/566* (2013.01); *G06N 3/08* (2013.01); *H04L 63/145* (2013.01); *G06F 2221/033* (2013.01)

(58) Field of Classification Search
CPC .... G06F 21/552; G06F 21/566; G06F 21/567; G06F 2221/033; H04L 63/1416; H04L 63/145; G06N 3/0445; G06N 3/0454; G06N 3/08; G06N 5/003; G06N 20/10; G06N 20/20; G06K 9/00; G06K 9/6273; G06V 10/82
See application file for complete search history.

(56) References Cited

U.S. PATENT DOCUMENTS

| | | | | |
|---|---|---|---|---|
| 9,383,934 B1 * | 7/2016 | Lukacs | .................. | G06F 3/0619 |
| 2011/0041179 A1 * | 2/2011 | Stahlberg | .............. | G06F 21/566 |
| | | | | 726/23 |
| 2012/0079596 A1 * | 3/2012 | Thomas | .............. | H04L 63/1433 |
| | | | | 726/24 |
| 2015/0121522 A1 * | 4/2015 | Guido | ................... | H04W 12/12 |
| | | | | 726/23 |
| 2015/0358344 A1 * | 12/2015 | Mumcuoglu | ....... | H04L 63/1416 |
| | | | | 726/23 |
| 2016/0232354 A1 * | 8/2016 | Fraser | ................... | G06F 21/554 |
| 2018/0167403 A1 * | 6/2018 | Smith | ..................... | G06F 21/55 |
| 2018/0181752 A1 * | 6/2018 | Guri | ........................ | G06F 21/56 |
| 2018/0203996 A1 * | 7/2018 | Gathala | ................. | G06F 21/567 |

OTHER PUBLICATIONS

Smith et al, DEMO: Akatosh: Automated Cyber Incident Verification and Impact Analysis, 2017.*
Tobiyama et al, Malware Detection with Deep Neural Network Using Process Behavior, IEEE, 2016.*
Mosli et al., Automated malware detection using artifacts in forensic memory images, IEEE, 2016.*
Microsoft Computer Dictionary, 2002, Microsoft, Fifth Edition, pp. 104.*
Cohen et al, Trusted detection of ransomware in a private cloud using machine learning methods leveraging meta-features from volatile memory, Expert Systems with Applications, vol. 102, Jul. 15, 2018, pp. 158-178.*
Zaki et al., Unveiling the Kernel: Rootkit Discovery Using Selective Automated Kernel Memory Differencing, 2014.*

* cited by examiner

*Primary Examiner* — Minh Dinh
(74) *Attorney, Agent, or Firm* — Lempia Summerfield Katz LLC

(57) ABSTRACT

A system and method (referred to as the system) detect malware by training a rule-based model, a functional based model, and a deep learning-based model from a memory snapshot of a malware free operating state of a monitored device. The system extracts a feature set from a second memory snapshot captured from an operating state of the monitored device and processes the feature set by the rule-based model, the functional-based model, and the deep learning-based model. The system identifies identifying instances of malware on the monitored device without processing data identifying an operating system of the monitored device, data associated with a prior identification of the malware, data identifying a source of the malware, data identifying a location of the malware on the monitored device, or any operating system specific data contained within the monitored device.

20 Claims, 5 Drawing Sheets
(3 of 5 Drawing Sheet(s) Filed in Color)

INDEPENDENT MALWARE DETECTION ARCHITECTURE

PRIORITY CLAIM

This application claims priority to U.S. Provisional Patent Application No. 62/738,418 and U.S. Provisional Patent Application No. 62/738,437 filed Sep. 28, 2018, both of which are herein incorporated by reference.

STATEMENT REGARDING FEDERALLY SPONSORED RESEARCH AND DEVELOPMENT

These inventions were made with United States government support under Contract No. DE-AC05-00OR22725 awarded by the United States Department of Energy. The United States government has certain rights in the inventions.

BACKGROUND OF THE DISCLOSURE

Technical Field

This application relates to detecting software that disrupts, damages, or gains unauthorized access to a device and specifically, to agnostic malware detection systems.

Related Art

Malware causes significant economic and technical expenses. It corrupts data, destroys memory, steals information, and consumes resources. Malware typically takes months to discover and a significant amount of resources to recover from. Known detection systems rely on operating systems that drive the infected device and require updates with each operating system change. These systems consume resources reducing the efficiency and the performance of the monitored device.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The elements in the figures are not necessarily to scale, emphasis instead being placed upon illustrating the principles of the disclosure. Moreover, in the figures, like referenced numerals designate corresponding parts throughout the different views.

DETAILED DESCRIPTION

Figure 1:
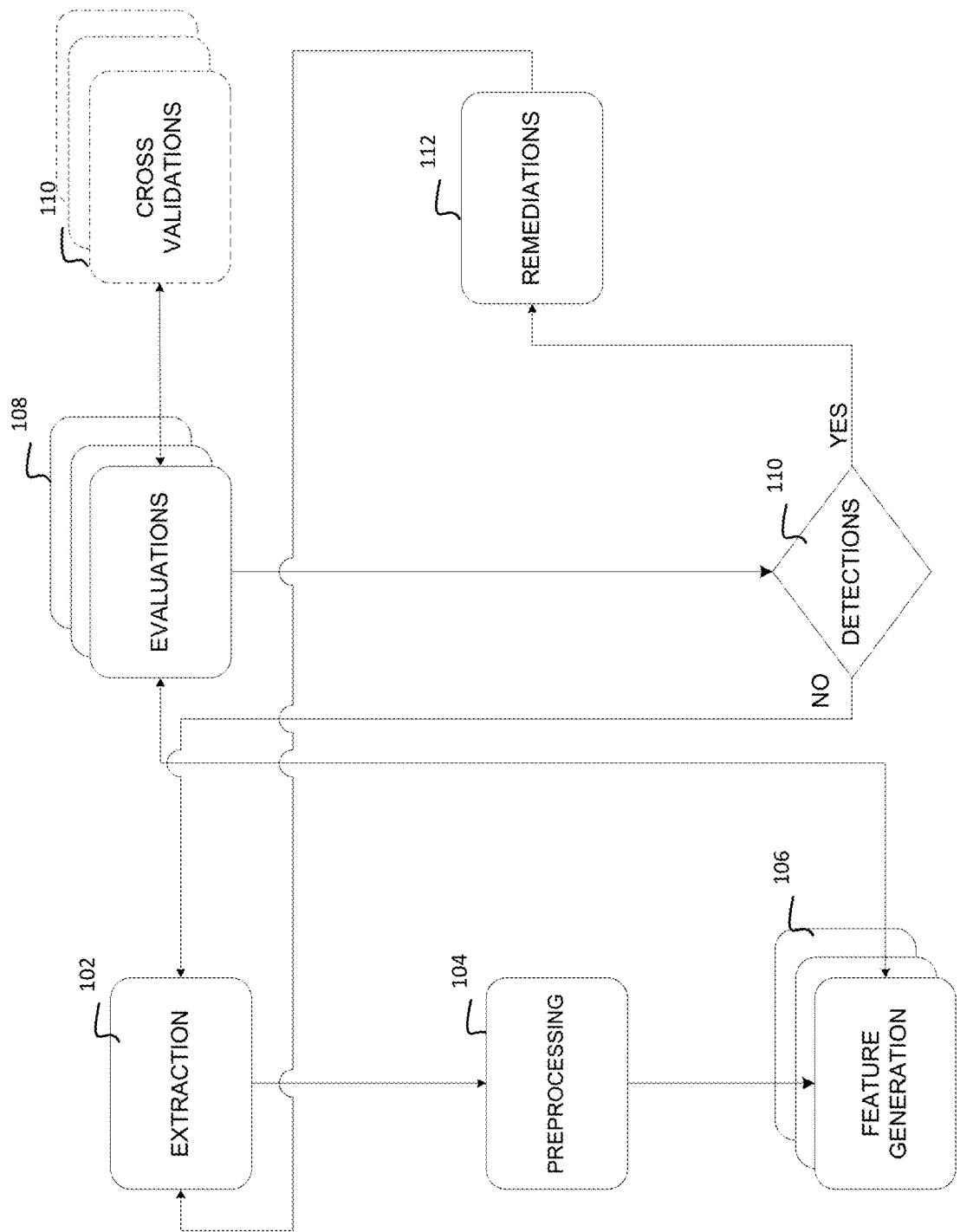
FIG. 1 illustrates an exemplary detection process.

A platform-independent malware detection process and system (referred to as a platform-independent detection system or simply a system) determines whether software is performing unwanted operations—that may be harmless or have a negative effect. The malware may interfere with the device's hardware, data files, operating system, or fill the device's memory with unwanted data or code. The disclosed systems detect both known and unknown threats without knowledge of the monitored device's operating system. When an infection is detected or suspected, some monitored systems are quarantined by isolating the devices on or from the networks. The isolation may halt the exchange of data with the infected device, may drain data from the infected device, and/or may execute other remediations, such as overwriting the device's operating system (OS) and/or restarting the system from an external write protected source.

In some systems, the monitored device comprises a cluster or a group of servers. A cluster refers to a group of independent network server computers that operate and appear to client devices as if they were a single server or single computer. Clustering improves network capacity by, among other things, enabling the server computers within the cluster to shift work in order to balance the processing load. By enabling one server computer to take over for another (e.g., fault tolerance) in response to the monitoring control, clustering also enhances network stability and minimizes or eliminates downtime caused by a device, software, or a server infection.

The platform-independent detection system processes a dataset generated from one or more non-malicious applications running in a normal operating state (e.g., an uncompromised or uninfected or malware free operating state). To generate the dataset, the systems run one or more application programs that a user is likely to run during a computing session and/or injects code into the monitored device. Exemplary injected code may initiate one or more asynchronous or synchronous kernel calls that are susceptible to malware infections. A computing session refers to the time in which a program or code is running during a persistent connection.

Based on the total number of programs running or loaded including programs running or loaded in the background, the platform-independent detection system initiates a wait state defined by a base delay and a moving or a variable time period that compensates for program and memory latency. The platform-independent detection system may delay generating or capturing an initial dataset via a memory snapshot for a variable period of about five seconds per program after a period of about twenty seconds lapses.

In the disclosed system, a memory snapshot represents the memory state of the monitored device at the moment the image is generated or captured. It contains information about all loaded classes and programs, about all existing objects, and references between objects of the device's operating state. An object is a variable comprising both software routines and data that is treated as a discrete entity. When an uninfected operating state is captured via one or more memory snapshots, the system may associate the memory snapshots with specific users and/or their customized computing environments. The associations may be stored as a part of one or more unique operating profiles that account for and represent the users' computing characteristics, hardware and software configurations, and computing preferences without retaining or storing knowledge or data that describes the monitored device's operating system. In some systems, the operating profiles are generated automatically (without manual intervention) and variably (e.g., at irregular time intervals to capture use patterns and characteristics of the hardware and software) through a computerized data capture and analysis and are processed by training devices to render or train evaluation models. The operating profiles may be differentiated or designated based on user demographics and job functions, for example.

Figure 5:
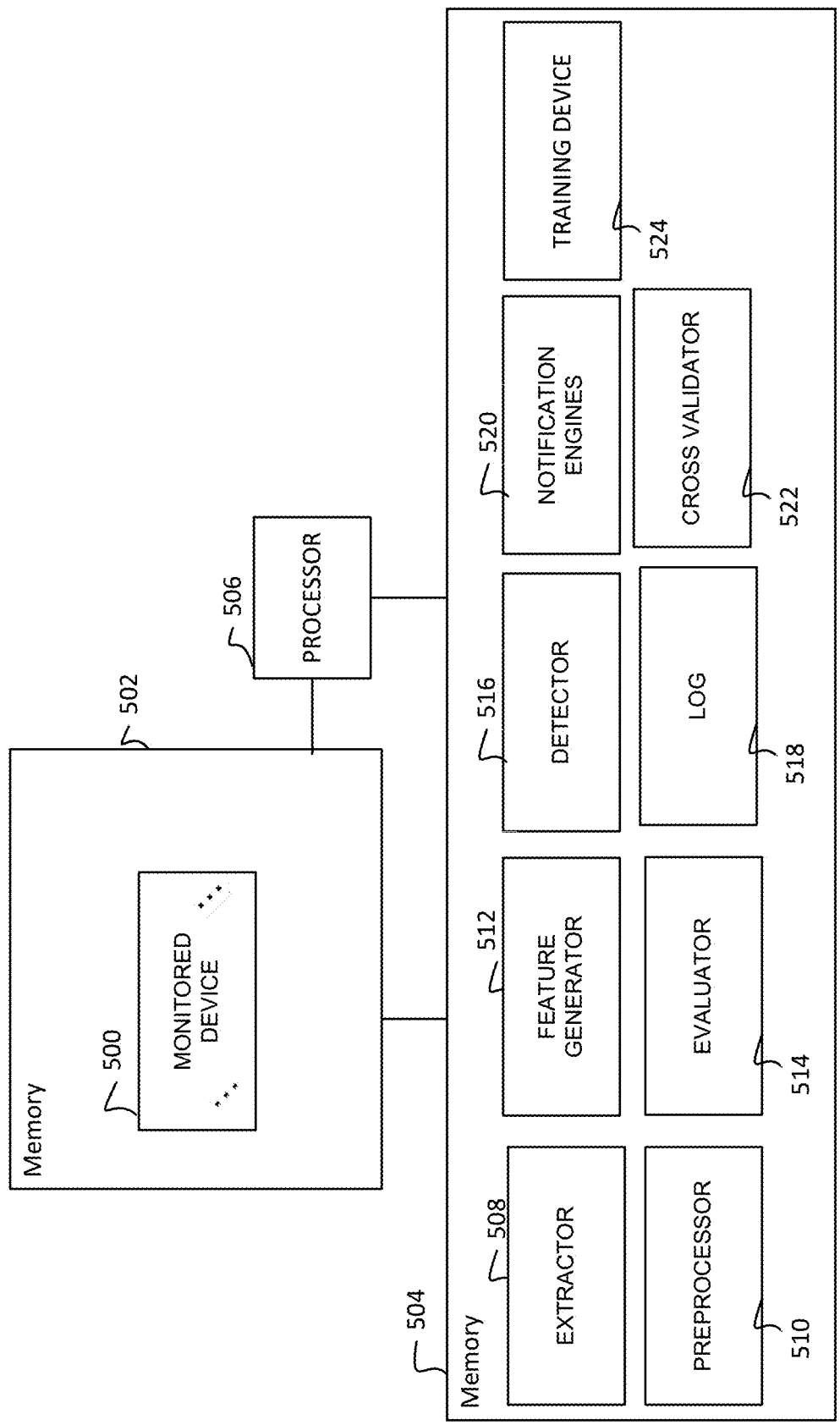
FIG. 5 is an exemplary detection system interfaced to a monitored device.

When the uninfected operating states are captured though benign memory snapshots and stored in memory, the systems extract other operating state data that reflect the monitored device's normal use through one or more evaluation snapshots via an extractor device 508 (shown in FIG. 5). If the snapshots are not translated, the benign memory snapshots and the evaluation memory snapshots are pre-processed into representations and stored in memory at 104 of FIGS. 1 and 2. The preprocessing 104 removes null bytes (i.e., 0x00) and eliminates redundant information from the benign and evaluation memory snapshots, respectively. The systems compare the pages of the snapshot images against other pages of the snapshot images taken from the same device and deduplicate identical and/or similar pages (e.g., pages are marked similar when they are nearly identical or they resemble each other by five percent or greater) in their respective benign and evaluation classes. By this process, the systems increase data compression ratios compared to standard compression utilities and reduces compression and decompression processing times. The elimination of redundant information and/or redundant pages and the encoding of data improve memory storage times, improves processing efficiency, and facilitates detailed analysis. The efficiency also enables the system to generate more than forty-two features and execute one or more traditional machine learning and/or deep learning processes to detect infections. In some applications, the detection occurs in real-time. In other words, the system may detect or predict an infection (or a potential infectious state) at the same rate data is received, enabling the system to quarantine or remediate memory blocks during an incubation period. An incubation period occurs after an exposure to malicious code but before a full infection propagates throughout the monitored device or before it causes a dissemination to other devices.

Figure 3:
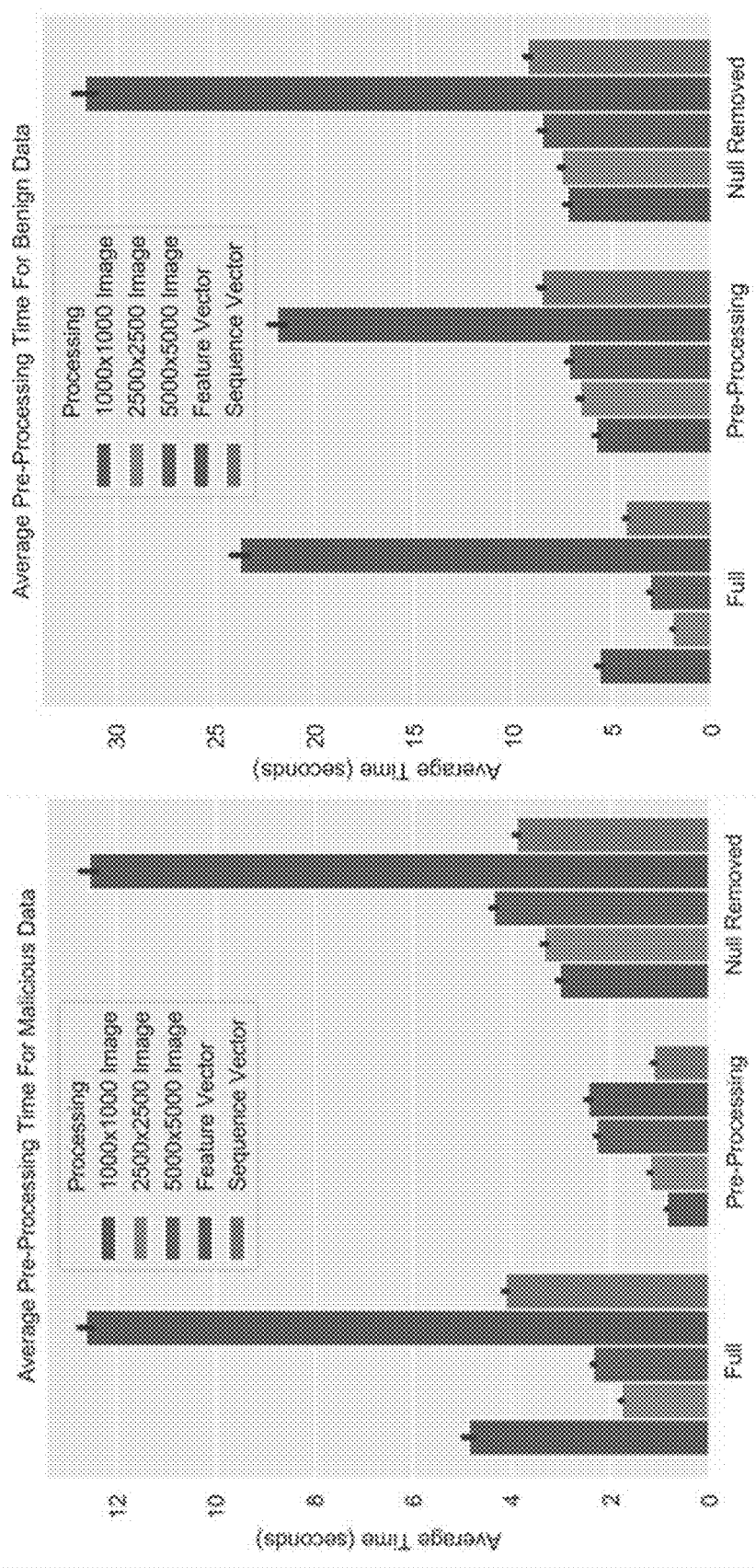
FIG. 3 illustrates the average pre-processing time for uninfected and infected memory snapshots.

In an exemplary use case, the system extracted images (e.g., memory snapshots) of various sizes (e.g., 1000×1000, 2500×2500, and 5000×5000) and stored the extracted images via a lossless compression. The various sizes of the extracted images are referenced by the colored legends of FIG. 3 showing the pre-processing times of the infected and uninfected data in this use case. The images were thereafter compressed by condensing a binary matrix by an averaging of a sequence of "n" bytes and in some applications, rescaled and stored in memory to preserve information. The averaging factor value may vary with the size of the original memory snapshot and the desired granularity. Applying the process to one or more-byte sequences, the systems generated condensed raw byte sequences too.

Figure 2:
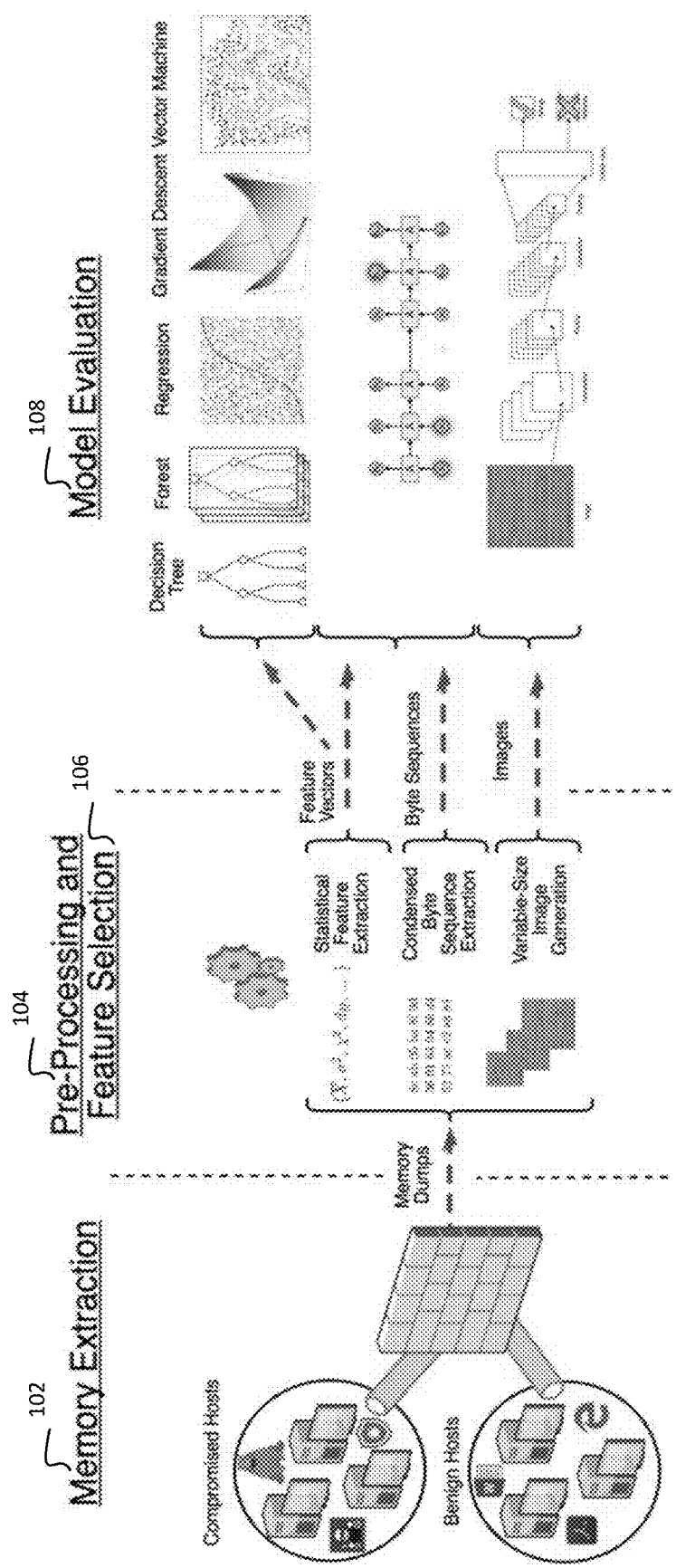
FIG. 2 illustrates a second exemplary detection process.

Applying a statistical feature extraction, a condensed byte extraction, and/or a variable size image generation shown in FIG. 2, a feature generator 512 (shown in FIG. 5) rendered a predetermined number of feature sets at 106. In this exemplary use case, forty-three features were extracted to form a feature set including features that represent prime-number metrics, distance metrics, statistical metrics such as variance and standard deviation, and/or probability tests such as the Chi-Squared metric through the processes identified in Table 1 below.

In a use case, forty-three features were processed to generate feature vectors from bytes of the memory snapshots. Some features measured statistical properties such as minimums, maximums, arithmetic means, variances, standard deviations, and Euclidean distance. Other measures included geometric mean, harmonic mean, and standard deviation of the mean. A geometric mean is the "$n^{th}$" root of the product of "n" numbers. The harmonic mean is the reciprocal of the arithmetic mean. The standard deviation of the mean is the standard deviation divided by the square root of the sample size, that is, the number of bytes. Other distance metrics were also executed on the byte sequences. In these use cases, the distances were computed with respect to a zero vector of the appropriate size. A Hamming distance was executed, which tracks the number of nonzero entries in a byte sequence. An Energy distance, Wasserstein distance, and Bray-Curtis distance were also processed. The Minkowski distance was computed for all prime numbers between three and forty-three. The Minkowski distance comprises a generalization of the Euclidean distance. In this disclosure, a Euclidean distance between two points $(x_1, x_2, \ldots, x_n)$ and $(y_1, y_2, \ldots, y_n)$ is $(\Sigma_{i=1}^{n}(x_i-y_i)^2)^{1/2}$. The Minkowski distance between two points $(x_1, x_2, \ldots, x_n)$ and $(y_1, y_2, \ldots, y_n)$ is $(\Sigma_{i=1}^{n}(x_i-y_i)^p)^{1/p}$. The computed distances consider the byte representation of the memory snapshots as points in space. In some applications, the machine can identify different clusters of points. For example, in some circumstances the benign memory snapshots fall all within two units of the zero vector, whereas the malicious memory snapshots are at least four units away from the zero vector. Other computed statistical measures include measuring the skew, which is a measure of asymmetry of the probability distribution, was computed. The kurtosis measured "tailedness" of the distribution. The Jaccard-Needham dissimilarity measured the similarity and diversity of sample sets. Other measures included the Shapiro-Wilk Test, Chi-Square Test, entropy and p-adic valuations. The entropy measured the amount of disorder and randomness in the data. The p-adic valuation measured the divisibility by prime numbers. In the exemplary use case, ten bytes sequences were averaged, then added together, and then the divisibility of a prime and its powers were progressively evaluated. The analysis was executed for prime numbers between 2 and 29.

Due to the processing efficiencies gained by the processes described above, the average time to complete the processing of the snapshots was less than thirty five seconds per snapshot; for a feature vector extraction, the average time for generating all images or extracting the byte sequences was less than ten seconds when executed on a 2.5 GHz machine as graphically shown in FIG. 2. Faster systems and the efficiencies described above render real-time detections.

TABLE 1

| Feature Generation (starred features generate more than one feature parameter) Statistical Features | |
|---|---|
| Min/Max | Geometric, Harmonic, Standard Error, Arithmetic Mean |
| Entropy | Hamming, Energy, Euclidean, Wasserstein, Bray-Curtis Minkowski* Distance |
| Chi-Square Test | Skew, Kurtosis, Variance, Standard Deviation |
| P-adic Valuation* | Jaccard-Needham Dissimilarity |
| Shapiro-Wilk Test | |

Applying rule-based models, functional based models, and/or deep learning models, the systems executed evaluations that rendered malware detections that on average were greater than ninety-seven percent accurate. The rule-based and functional based models applied statistical classifications such as logistic regression models, decision trees based on C4.5 algorithms and/or recurrent classifiers.

Some recurrent classifiers train on a predetermined number of benign data points extracted from the benign memory snapshot, such as two hundred data points, for example. In an exemplary training, an exemplary recurrent algorithm samples with replacements the two-hundred benign data points, which the system designates the first random component or first branch of the decision tree. The second exemplary random component follows as the algorithm builds the entire decision tree. The system selects a random sub-set of the predictors that splits the two-hundred data points. So, if an exemplary thirty-six predetermined predictors of an uninfected state are processed, the system may select a random number of those, say half of the total number of predictors, for example, and evaluate a first exemplary split of the two-hundred data points using each of the eighteen predictors (e.g., half of thirty-six). The classifier selects the predictor that provides the best split and then executes another random sample of the exemplary thirty-six predictors to minimize a loss function of the first exemplary decision tree branch (e.g., the first classification stage) when its outputs are added to the first exemplary decision tree branch. The minimization of the loss function is achieved by recursively splitting the benign dataset according to a second criterion. The criterions (e.g., the first, second, third, . . . ) may be based on gradient statistics. A third exemplary decision tree branch is then sequentially generated to minimize the loss function of the second exemplary decision tree branch (e.g., the second classification stage) when its outputs are added to the first and the second exemplary decision tree branches. This is achieved by recursively splitting the training data according to a third criterion. The exemplary classification continues until a prediction accuracy is achieved or exceeded. In the use case described, the process continued until on average about a ninety-eight percent prediction accuracy was attained. In FIGS. 1 and 2, the recurrent classifier executes a predetermined number of iterations based on the total number of available samples. Based on a measure of the output, a consensus is measured and identified. The decision tree with the highest score is selected, and if its confidence level exceeds the predetermined threshold, it is used to transmit its prediction of an infected or an uninfected device.

In FIGS. 1 and 2 exemplary functional based models are also used for evaluation by the evaluator device 514 included a Stochastic Gradient Descent model, and a Support Vector Classifier. For both of the rule-based models and the functional based models, the systems trained via a training device 524 shown in FIG. 5 executing a probabilistic grid search across the available hyper-parameters to tune the models, which were thereafter cross-validated at optional 110 by a cross-validator 522. Several methods may be used to tune hyper-parameters, such as grid and random search and manual tuning, for example. The probabilistic grid search applied to the system is different from the aforementioned techniques because it uses past evaluation results to select the next hyper-parameter values. Probabilistic grid search, driven by Bayesian statistics, for example, limits expensive evaluations of hyper-parameters by choosing the next set based on choices that have previously performed well. This means that the selection of hyper-parameters occurs faster than other methods for hyper-parameter tuning. The training and validation split were executed at a non-overlapping break of 75% to 25% of the training data (e.g., the benign data points). Because the evaluator device 514 and evaluation models described above herein (above and below) train on uninfected memory snapshots, the platform-independent detection system identifies previously unknown malware and obscured malware that has been modified to avoid detection by signature-matching comparisons. Thus, some platform-independent detection system detect malware without processing data identifying an operating system of the monitored device, or data associated with a prior identification of the malware, or data identifying a source of the malware, or data identifying the location of the malware. In some exemplary alternate systems, the models described above and below are training on infected memory snapshots too; and in other alternate systems all operating states, and in other alternate systems selected combination of uninfected and infected operating states; the various systems enable a more flexible and subtle identifications that may accommodate a customized application.

In the use case described, the pre-processed feature vectors were strong predictors of malware infections when comparing benign datasets to random and assorted percentages of malicious memory snapshots and strong predictors when comparing benign datasets or memory snapshots to fully infected memory snapshots. Principle component analysis (PCA) may also be used to determine which feature in the feature vector contributes the most to a final classification. Applying a PCA may determine which parts of the memory sample are most important or significant to the classification and thus, may help locate parts of the memory sample that are likely malicious by the classifier. Notably, the false positive rate, the ratio between the number of malicious snapshots incorrectly categorized as benign and the total number of actual malicious snapshots, of this evaluator model was less than about three one-thousandths. A summary of performance for selected machine-learning models is shown in Table 2.

TABLE 2

Results from Processing Nine-Thousand Snapshots Evaluation Metrics

| Algorithm | Accuracy | Mean Fit Time | Mean Score Time | FPR |
|---|---|---|---|---|
| Decision Tree | 0.995851 | 0.017205 | 0.001449 | 0.002667% |
| Logistic Regression | 0.994814 | 0.081668 | 0.0247176 | 0.002667% |
| Random Forest | 0.996507 | 0.781202 | 0.002633 | 0.002667% |
| SGD | 0.991555 | 0.033968 | 0.012932 | 0.001778% |
| SVM | 0.994518 | 0.125464 | 0.013279 | 0.002667% |

Evaluations may also be executed by deep learning models that may be trained using the various sized images such as the exemplary images described above. The deep-learning networks may include one or more artificial neural networks or recurrent neural networks. The neural networks comprise artificial neurons or processing elements that are organized in interconnected layers such as an input layer, a hidden layer that may include one or more layers, and an output layer that are collectively described via a feature layer. The parameters that makeup the feature layer specify the neural network layers such as the convolution layers, pooling layers, normalization layers, rectified linear unit layers, etc. or any other layer that may be used in a neural network. In some systems, the neural network layers process two-dimensional maps representing the original benign memory snapshot images. An image is a stored description of a graphic picture made up of a set of brightness and color values of pixels. A fully connected neural network layer may specify another part of the neural network as referred to as the classification layers. The fully connected layers execute the highest level of reasoning executed by the neural networks and have connections to all of the activation layers of the preceding layer. Each layer type may specify distinct functions that specify the processing executed by that layer.

Some exemplary generation of the neural networks track a current layer's input/output dimensions and apply I/O rules that limit the selected hyperparameters of a layer to ranges that fall within other ranges that can be processed by the input of a subsequent layer. A next layer's input dimensions may be specified after hyperparameters of an immediately preceding layer are specified, which modifies the amount of data that can flow to the backend of the neural network. By applying limiting rules, a progressive constraint is generated, tracked, stored in memory, and applied by the system during model training to ensure that changes in a preceding layer is compliant and cascades through the requirements of the subsequent backend layers. The progressive constraint limits the possible configurations represented by later developed networks.

Figure 4:
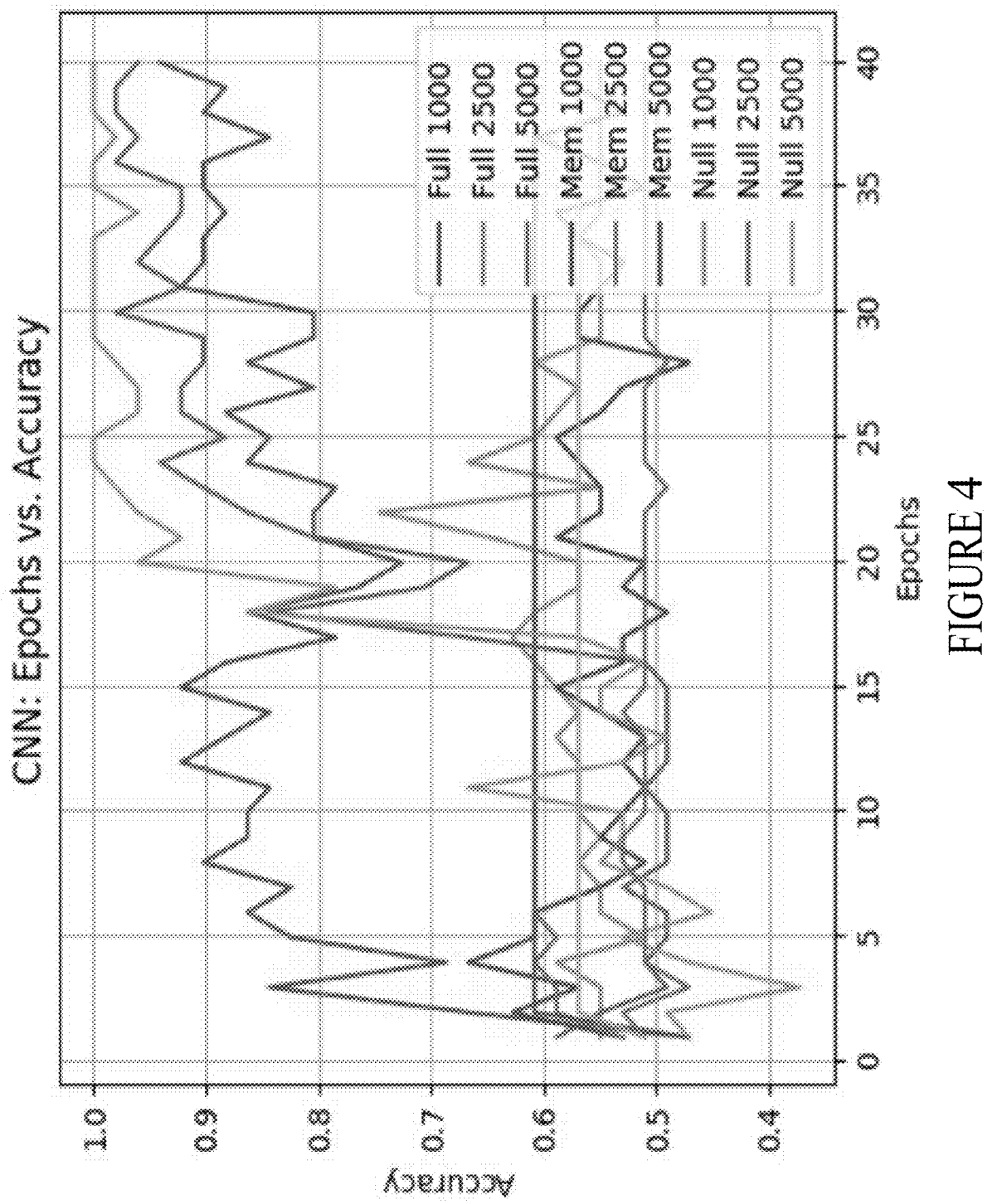
FIG. 4 is graph identifying the accuracy of a neural network.

In the exemplary use case, a Convolutional Neural Network (CNN), was trained using the various sized images from the pre-processing methods described. The exemplary CNN was comprised of multiple layers, including pooling layers and fully connected layers. The system training executed a probabilistic grid search to actively tune the hyperparameters and sequence the network layers to improve performance. Using the cross-validation and the training split described above, (e.g., the 75%/25% train/test split), the exemplary system rendered an accuracy over fifty epochs as shown FIG. 4. For over three thousand samples evenly balanced between benign and malicious image representations, the CNN model achieved an accuracy rate of 98% or greater.

With the infectious state detected at 110, the platform-independent detection system may initiate a remediation at 112, and in some alternate system can also locate when and where an infection occurred and/or resides. The detection and/or the location of the infection may be processed to determine whether to drain traffic from the monitored device, when the monitored device should stop taking new sessions, and when to let existing sessions expire and quarantine some or all of the monitored device. The platform-independent detection system may shutdown or quarantine the infected software or portions of infected memory of the monitored device or the monitored device completely. The remediation may be executed according to one or more customized recovery policies stored in one or more recovery profiles in memory that may be tailored to the user or monitored system. It may describe the desired operating state or desired configuration and characteristics of the monitored device. When an infectious state is not detected at 110, the process repeats at 102. In some alternate systems, one, two, or more of the evaluation models are used to detect or predict a malware infection. A weighting function in some detectors 516 give some detections more "weight" or influence than other detections at 110. Weights may be adjusted manually and/or by the system based on the monitored systems operating speed (is it operating slowly), crashes, Input/output (I/O) (e.g., unexpected increases in transmission rates), an inability to access a control panel, empirical analysis, recognition of higher accuracy rates, and/or based on unusual error messages.

FIG. 5 is a block diagram of an alternate automated system that may execute the process flows and characteristics described above and those shown in FIGS. 1-4 to detect infectious software code. The system comprises processors 506, a non-transitory computer readable medium such as a memory 502 and 504 (the contents of which are accessible by processor 506), a monitored device 500 and an Input/output interface (I/O interface—not shown). The I/O interface connects devices and local and/or remote applications such as, for example, additional local and/or remote monitored devices. The memory 502 and 504 stores instructions in a non-transitory media, which when executed by the processors 506, causes the platform-independent detection system to render some or all of the functionality associated with detecting or predicting an infectious event such as an exposure to infectious software, for example. The memory 502 and 504 stores software instructions, which when executed by the processors 506, causes the automated platform-independent detection system to render functionality associated with the extractor device 508, the preprocessor 510, the feature generator (or capture module) 512, the evaluator device 514, the detector device 516, the log device 518 (recording the systems performance and/or model training), the notification engine device 520 (generating a visual, textual, or auditory signal or control signal alerting a user of the infected and/or uninfected condition), and the cross validator device 522. In yet another alternate automated detection system, the non-transitory media provided functionality is provided through cloud storage. In this automated detection system, cloud storage provides ubiquitous access to the system's resources and higher-level services that can be rapidly provisioned over a distributed network. Cloud storage allows for the sharing of resources to achieve consistent services across many monitored devices at many local and remote locations and provides economies of scale.

The memory 502 and 504 and/or storage disclosed may retain an ordered listing of executable instructions for implementing the functions described above in a non-transitory computer code. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random-Access Memory (RAM), a Read-Only Memory (ROM), an Erasable Programmable Read-Only Memory (EPROM or Flash memory), or a database management system. The memory 502 and 504 may comprise a single device or multiple devices that may be disposed on one or more dedicated memory devices or disposed on a processor or other similar device. An "engine" comprises a hardware processor or a portion of a program executed by a processor that executes or supports event detection and infection predictions. When functions, steps, etc. are said to be "responsive to" or occur "in response to" another function or step, etc., the functions or steps necessarily occur as a result of another function or step, etc. It is not sufficient that a function or act merely follow or occur subsequent to another. The term "substantially" or "about" encompasses a range that is largely (anywhere a range within or a discrete number within a range of ninety-five percent and one-hundred and five percent), but not necessarily wholly, that which is specified. It encompasses all but an insignificant amount.

In some systems, each of the models described herein train on datasets when a malware infection initially occurs but before a full infection is established. These systems generate intermediate models of an exposed system that can identify unknown forms of infection even before the malware forces the monitored device into a noticeable or compromised state. The detection may occur by detecting operating states during incubation periods, which also enables more flexible and nuanced detection.

The disclosed systems and/or methods allow a monitored device, whether from traditional informational technology infrastructure (e.g., Mac, Windows, Linux, etc.) or operating technology infrastructure (e.g., SCADA, ICS, automotive control, etc.), to be instrumented and leveraged to detect infected operating states and protect uninfected operating state of the monitored device. Specifically, an uninfected operating state can be extracted as both a computer memory representation and a representation of some or all of the data on the monitored device. An array of intrusion detection models and evaluators process the memory improving the analysis and security incident detection capabilities of the monitored devices. The platform-independent detection system is agnostic and does not require or have any knowledge of the monitored systems operating system.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A non-transitory computer-readable medium having stored thereon a plurality of software instructions that, when executed by a processor, causes:
   training, by a training device, a rule-based model, a functional-based model, or a deep learning-based model from a memory snapshot of a malware free operating state of a monitored device;
   extracting, by an extractor device, a feature set from a second memory snapshot captured from an operating state of the monitored device, wherein the feature set is stored in a feature vector;
   processing, by an evaluator device, the feature set by the rule-based model, the functional-based model, or the deep learning-based model; and
   identifying, by a detector device based on a malware classification, a malware on the monitored device, without processing data identifying an operating system of the monitored device or data associated with a prior identification of the malware or data identifying a source of the malware or data identifying a location of the malware on the monitored device;
   wherein the processing of the feature set comprises executing a principal component analysis that identifies a plurality of features in the feature vector that are most significant to the malware classification.

2. The non-transitory computer-readable medium of claim 1 where the monitored device comprises a cluster that comprises a group of independent computers that operate and appear to a client device as if they are a single computer.

3. The non-transitory computer-readable medium of claim 1 where the memory snapshot of the malware free operating state of the monitored device is generated from one or more non-malicious software applications running in a normal operating state.

4. The non-transitory computer-readable medium of claim 1 where the software that causes the system to train causes the system to train the rule-based model, the functional based model, and the deep learning-based model from the memory snapshot of the malware free operating state of the monitored device.

5. The non-transitory computer-readable medium of claim 1 where the software that causes the system to process the feature set processes the rule-based model, the functional-based model, and the deep learning-based model.

6. The non-transitory computer-readable medium of claim 1 where the plurality of software instructions further causes the processor to remove a null byte from the memory snapshot of the malware free operating state of the monitored device.

7. The non-transitory computer-readable medium of claim 1 where the plurality of software instructions further causes the processor to remove a null byte from the memory snapshot of the malware free operating state of the monitored device before the training device trains the rule-based model, the functional based model, or the deep learning-based model from the memory snapshot of the malware free operating state of the monitored device.

8. The non-transitory computer-readable medium of claim 7 where the plurality of software instructions further causes the processor to remove a plurality of redundant pages from the memory snapshot of the malware free operating state of the monitored device before the training device trains the rule-based model, the functional based model, or the deep learning-based model from the memory snapshot of the malware free operating state of the monitored device.

9. The non-transitory computer-readable medium of claim 1 where the memory snapshot of the malware free operating state of the monitored device comprises a plurality of extracted images form the monitored device comprising a plurality of dimensions.

10. The non-transitory computer-readable medium of claim 1 where the rule-based model comprises a classifier that minimize a loss function of a plurality of preceding classification stages when an output of a subsequent classifier is added to the preceding classification stages.

11. The non-transitory computer-readable medium of claim 1 further comprising remediating the monitored device by monitoring a computing session of the monitored device and quarantining the monitored device from a network when the computing session expires.

12. The non-transitory computer-readable medium of claim 1 further comprising generating training data indicative of a potential infectious state of the monitored device without identifying the malware.

13. The non-transitory computer-readable medium of claim 1 where the identifying, by a detector device, occurs in real-time and the extracting, by the extractor device, a feature set from the memory snapshot occurs after a malware infection occurs but before the malware forces the monitored device into a noticeable compromised state.

14. A method of detecting malware, comprising:
   training, by a training device, a rule-based model, a functional-based model, or a deep learning-based model from a memory snapshot of a malware free operating state of a monitored device;
   extracting, by an extractor device, a feature set from a second memory snapshot captured from an operating state of the monitored device, wherein the feature set is stored in a feature vector;
   processing, by an evaluator device, the feature set by the rule-based model, the functional-based model, or the deep learning-based model; and
   identifying, by a detector device based on a malware classification, a malware on the monitored device, without processing data identifying an operating system of the monitored device or data associated with a prior identification of the malware or data identifying a source of the malware or data identifying a location of the malware on the monitored device;
   wherein the processing of the feature set comprises executing a principal component analysis that identifies a plurality of features in the feature vector that are most significant to the malware classification.

15. The method of claim 14 where the monitored device comprises a cluster that comprises a group of independent servers that operate and appear to a client device as if they are a single computer.

16. The method of claim 14 where the memory snapshot of the malware free operating state of the monitored device is generated from one or more non-malicious software applications running in a normal operating state.

17. A method of detecting malware, comprising:
training, by a training device, a rule-based model, a functional-based model, or a deep learning-based model from a memory snapshot of a malware free operating state of a monitored device;
extracting, by an extractor device, a feature set from a second memory snapshot captured from an operating state of the monitored device;
processing, by an evaluator device, the feature set by the rule-based model, the functional-based model, or the deep learning-based model; and
identifying, by a detector device, a malware on the monitored device, without processing data identifying an operating system of the monitored device or data associated with a prior identification of the malware or data identifying a source of the malware or data identifying a location of the malware on the monitored device;
where the method trains the rule-based model, the functional based model, and the deep learning-based model from the memory snapshot of the malware comprise free operating states of the monitored device and the deep learning model's hyperparameters are tuned by a Bayes rule.

18. A system that detects malware, comprising:
a training device that trains a rule-based model, a functional-based model, and a deep learning-based model from a memory snapshot of a malware free operating state of a monitored device;
an extractor device that extracts a feature set from a second memory snapshot captured from an operating state of the monitored device, wherein the feature set is stored in a feature vector;
an evaluator device that processes the feature set by the rule-based model, the functional-based model, or the deep learning-based model; and
a detector device that detects a malware on the monitored device based on a malware classification, without processing data identifying an operating system of the monitored device or data associated with a prior identification of the malware or data identifying a source of the malware or data identifying a location of the malware on the monitored device;
wherein the evaluator device executes a principal component analysis that identifies a plurality of features in the feature vector that are most significant to the malware classification.

19. The system of claim 18 where the training device causes the system to train a neural network by training on a plurality of images.

20. The system of claim 18 where the training device causes the system to train a recurrent neural network by training on a byte sequence representing the memory snapshot.

* * * * *